(12) United States Patent
Patel et al.

(10) Patent No.: US 8,182,926 B2
(45) Date of Patent: May 22, 2012

(54) PROTECTIVE FILMS FOR TEXTURED SUBSTRATES

(75) Inventors: Shailesh C Patel, Chesterfield, VA (US); Gary Michael Balakoff, Midlothian, VA (US); Bankim Desai, Chesterfield, VA (US)

(73) Assignee: Tredegar Film Products Corporation, Richmond, VA (US)

( * ) Notice: Subject to any disclaimer, the term of this patent is extended or adjusted under 35 U.S.C. 154(b) by 429 days.

(21) Appl. No.: 12/383,448

(22) Filed: Mar. 24, 2009

(65) Prior Publication Data
US 2009/0186236 A1      Jul. 23, 2009

Related U.S. Application Data

(60) Continuation-in-part of application No. 11/503,441, filed on Aug. 11, 2006, now abandoned, which is a division of application No. 10/601,581, filed on Jun. 24, 2003, now abandoned.

(51) Int. Cl.
*B32B 27/08* (2006.01)
*B32B 7/12* (2006.01)

(52) U.S. Cl. ........ 428/515; 428/518; 428/520; 428/343; 156/327

(58) Field of Classification Search .................. 428/515, 428/518, 520, 343, 355; 156/327
See application file for complete search history.

(56) References Cited

U.S. PATENT DOCUMENTS

| 5,108,844 A * | 4/1992 | Blemberg et al. ............. 428/518 |
| 5,286,781 A * | 2/1994 | Gotoh et al. .................. 524/505 |
| 7,645,507 B2 | 1/2010 | Vermunicht et al. |
| 2004/0265540 A1 | 12/2004 | Balakoff et al. |

FOREIGN PATENT DOCUMENTS

JP     2003327936 A     11/2003

OTHER PUBLICATIONS

English translation of Notice of Reasons for Rejection mailed Feb. 21, 2012 in connection with Japanese Patent Application 2012-066442.

* cited by examiner

*Primary Examiner* — William Cheung

(57) ABSTRACT

Surface protection films are disclosed that comprise an outer surface contact layer, an outer stiffening layer, and optionally a core layer, wherein the surface contact layer consists essentially of (A) a mixture of a tackified quadblock styrene block copolymer elastomer and a triblock styrene block copolymer containing up to 30 wt % of a diblock styrene copolymer; (B) a mixture of a tackified quadblock styrene block copolymer elastomer, a tackified triblock styrene block copolymer and a triblock styrene block copolymer containing up to 30 wt % of a diblock styrene copolymer; (C) a mixture of a tackified triblock styrene block copolymer and a triblock styrene block copolymer containing up to 30 wt % of a diblock styrene copolymer; or (D) a triblock styrene block copolymer containing up to 30 wt % of a styrene diblock copolymer and a low density polyethylene polymer.

10 Claims, 2 Drawing Sheets

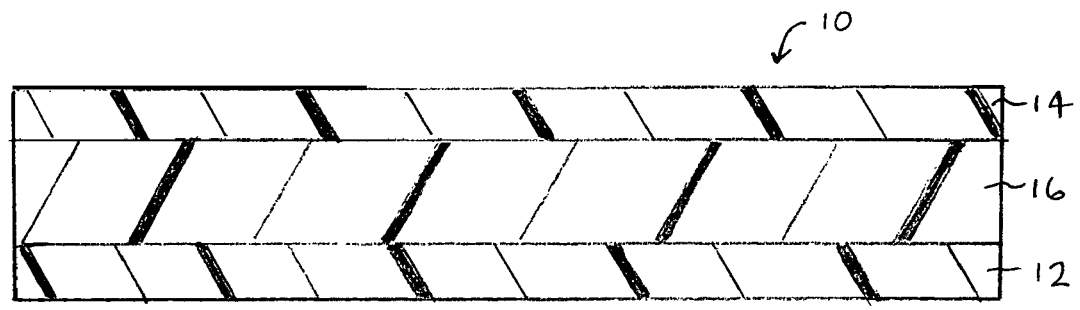
FIGURE 1
FIGURE 2
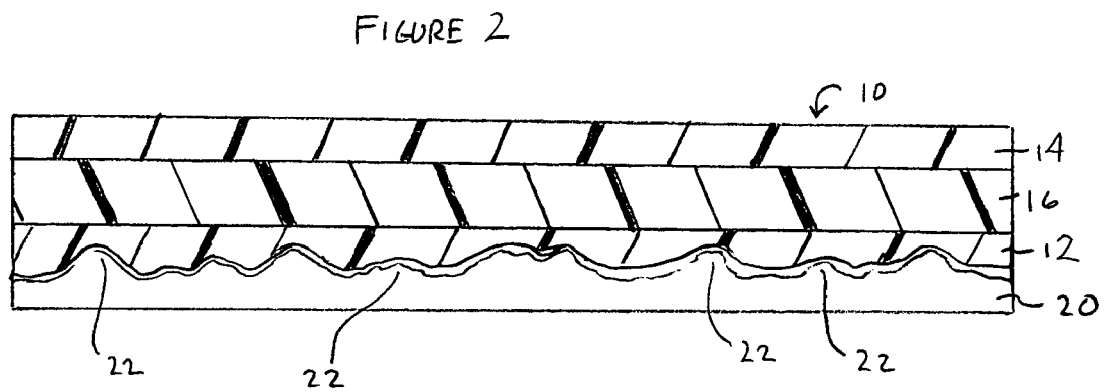

PROTECTIVE FILMS FOR TEXTURED SUBSTRATES

CROSS-REFERENCE TO RELATED APPLICATIONS

This application is a continuation-in-part of, and claims benefit to, U.S. patent application Ser. No. 11/503,441, filed Aug. 11, 2006 now abandoned, which is a divisional application of U.S. patent application Ser. No. 10/601,581, filed Jun. 24, 2003 now abandoned, both of which are entitled "Masking Film For Textured Surfaces".

BACKGROUND OF THE DISCLOSURE

The present disclosure is related to films for use in protecting substrate surfaces from damage or contamination. More specifically, the disclosure concerns surface protection films that are free of adhesive coatings, yet offer high adhesion with the substrate, particularly substrates having a textured surface topography.

Surface protection films, also referred to as masking films, are used in numerous applications as a protective covering for surfaces. Typically, the films are used to protect smooth, relatively rigid surfaces, such as acrylics, polycarbonates, glass, polished or painted metals, glazed ceramics, and other smooth, relatively rigid surfaces. The film is applied to the surface to be protected and acts as a physical barrier to prevent scratching, scuffing and marring of the surface. Protection provided by masking films is particularly useful while these surfaces are being printed, transported, or otherwise handled prior to use.

Traditionally, protection for smooth surfaces has been provided via corona treated films and/or adhesive coated masking paper. However, disadvantages exist with these techniques. For example, it is difficult to control the amount of corona treatment to provide good adhesion, yet good release properties. In addition, corona treated masking films have a relatively high surface coefficient of friction and tend to form rigid wrinkles in the film. Such wrinkles are difficult, if not impossible, to remove, thus precluding the film from adequately protecting the surface to be protected and/or permanently distorting the surface to be protected. Also, corona treated polyethylene films commonly have numerous large gels and carbon specks associated with them which can produce dimples in, or otherwise mar, the surface to be protected.

Disadvantages are also associated with masking films using an adhesive coated paper. Moisture from humidity or elsewhere can permeate the masking material and loosen or completely separate the masking material from the surface to be protected. The tendency for moisture to adversely affect the performance of this type of masking film is increased where heat is required to activate the adhesive coating. Additionally, even where the masking material remains firmly adhered to the surface to be protected until its removal is desired, such removal can require the use of a solvent to remove trace amounts of the adhesive coating. The adhesive residue left behind on the surface is of particular concern where the surface being protected is to be used in a context where sanitary conditions are desired, such as in food industry applications.

Recent advances in masking film technology have produced improved masking films formed without corona treatment or the use of adhesive coatings, including one side smooth, one side matted ("OSM") masking films. Such OSM films are more fully described in U.S. Pat. Nos. 4,895,760 and 5,100,709, the disclosures of which are incorporated herein by reference. These advanced masking films rely upon the tendency for smooth surfaces to adhere to each other to produce an adequate and constant level of adhesion without the need for corona treatment and the use of adhesive coatings. Additionally, the matted side of the OSM films prevents blocking and wrinkling of such films by preventing a measure of intimate contact between the surfaces.

Despite the advanced nature of the OSM films, however, it was discovered that the level of adhesion produced by these improved masking films can vary with temperature and other conditions associated with the production and use of such improved films. At times, such conditions can result in a masking film exhibiting either too much or not enough adhesion level for the desired application. In other applications, it can result in the need for heaters to raise the temperature of the film so that proper application and adequate adhesion level are achieved. Moreover, because the level of adhesion produced is primarily a function of the interaction between the smooth surface of the masking film and the smooth surface to be protected, the smoothness of the surface requiring protection is a significant factor. This factor can present difficulties, and masking films of this type are of limited utility, where the surface to be protected is not particularly smooth, that is, the surface has a textured topography.

Multilayer masking films also have been coextruded with pressure-sensitive adhesive, as described in U.S. Pat. Nos. 5,286,781 and 5,427,850. These films use styrene-butadiene-styrene (SBS), styrene-isoprene-styrene (SIS), styrene-butadiene (SB), and styrene-isoprene (SI) block copolymers. These block copolymers have poor heat and aging stability due in part to the presence of double bonds. These films also contain anti-blocking agents to provide good unwinding ability, to reduce the rise in tackiness and to prevent the film from laminating to itself while stored in rolls. The anti-blocking agent can migrate (bloom) with temperature and time to ultimately contaminate the substrate surface. Varying levels of anti-blocking agent also results in varying levels of adhesion to the substrate.

There remains a need for a masking film capable of providing an adequate level of protection to surfaces that are textured. There is further a need to provide a functional, adjustable and controlled level of adhesion between the masking film and the textured surface to be protected without the use of corona treatment or an adhesive and their associated disadvantages and under a variety of production and application conditions.

SUMMARY OF THE DISCLOSURE

In accordance with the disclosure, there is provided a masking film that adheres to and provides protection for textured surfaces. The masking films are free of adhesive coatings. The level of adhesion between the film and the textured substrate is adjustable so as to accommodate a variety of substrate chemistries and topographies. For example, the masking films can provide a functional level of adhesion to textured polycarbonate, acrylic, polyvinyl chloride, nylon, and polyester (PET, PETG, PEN) at room or ambient temperature. Accordingly, for virtually any given processing environment, including temperature and line equipment layout, and desired application, the protective films can provide an adequate level of adhesion to the surface of interest. The protective film also remains removably attached to the substrate after aging and/or heating.

BRIEF DESCRIPTION OF THE DRAWING FIGURES

FIG. 1 is an embodiment of a film in accordance with the disclosure.

FIG. 2 is an embodiment of a film in accordance with the disclosure shown adhered to a textured substrate.

DETAILED DESCRIPTION

Figure 3:
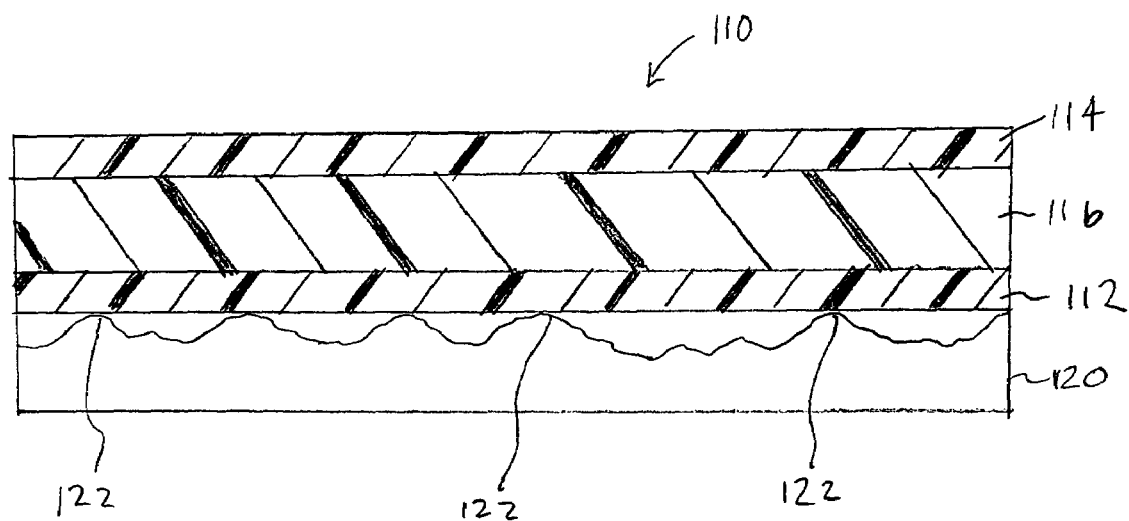
FIG. 3 is an illustration, similar to FIG. 2, showing the contact region of prior art masking films with textured surface substrates.

The films of this disclosure provide an excellent balance of adhesive strength (as measured by a peel test), cohesive strength, low elongation, and good handling. Because the surface topography of textured substrates can vary significantly, it is advantageous to be able to easily tailor the properties of the film to provide the right balance of properties. Significantly, these films of this disclosure satisfy that important commercial and practical need as well.

The terms "substantially" and "about" means that a given property or parameter (such as the surface roughness) may vary by up to 20% from the stated value.

As used throughout this disclosure, the singular forms "a," "an," and "the" include plural reference unless the context clearly dictates otherwise. Thus, for example, a reference to "a compound" includes a plurality of such compounds, and a reference to "an ingredient" or "an additive" is a reference to one or more ingredients or additives and equivalents thereof known to those skilled in the art, and so forth.

Unless defined otherwise, all technical and scientific terms used herein have the same meanings as commonly understood by one of ordinary skill in the art to which this disclosure belongs. Although any methods and materials similar or equivalent to those described herein can be used in the practice of the present invention, the preferred methods, devices, and materials are now described. All publications mentioned herein are cited for the purpose of describing and disclosing the various films, compounds, compositions, methods, etc., that are reported in the publications and that might be used in connection with the invention.

The term "film" refers to a web made by extruding a molten sheet of polymeric material by a cast or blown extrusion process and then cooling said sheet to form a solid polymeric web.

With reference to FIGS. 1 and 2, the films in accordance with the disclosure, designated generally at 10, comprise three layers: a surface contact layer 12, and a stiffening layer 14 and a core layer 16 positioned between the surface contact layer 12 and the stiffening layer 14. The layers are in intimate contact with one another, such as would be obtained by coextrusion or extrusion lamination. Any of the layers of film 10 can itself comprise one or more layers of material. For example, in some embodiments the core layer may comprise 70% of the total thickness of the film by volume. It may not be possible to extrude a film layer having a desired thickness in a single layer, so the core layer in such an embodiment may be extruded in two or more layers of the same (or different) composition.

With particular reference to FIG. 2, the surface contact layer 12 is adapted to make substantial contact with the surface of a substrate 20. As seen in FIG. 2, the substrate 20 has a plurality of aberrations 22 on its surface. The magnitude and frequency of the aberrations can vary widely from substrate to substrate. In particular, the surface roughness of the substrate 20 may be 3-100 microns between the peaks and valleys comprising the textured surface. The surface roughness may also be non-uniform across the width as well as length of the substrate.

The masking films of the present disclosure are designed to provide a surface contact layer 12 that has good conformability so it can substantially conform to the surface of the substrate topography. This conformability provides better surface contact between the substrate and the surface contact layer and, thus, better adhesion forces between them. High adhesion forces, however, increase the chance that the film layers may tear as the film is being removed from the substrate. Thus, the films of the present disclosure also provide good cohesion, such that the film remains intact when removed from the substrate.

As seen in FIG. 3, prior art films 110 made contact only with the peaks 122 on the surface of the substrate 120. As such, the ability of prior art masking films to adhere to the texture surface was compromised because of the low surface area contact between the substrate surface and the film. To compensate, it was often required to increase the adhesion level of the film to a point where residue was left on the substrate or the films would block. By contrast, the films 10 of this disclosure (as seen in FIG. 2) are able to substantially conform to the peaks and valleys comprising the surface topography of the substrate 20 and thus greater surface area contact between the textured substrate 20 and the surface contact layer 12 of the film.

The surface contact layer comprises a blended mixture of thermoplastic polymers. In one embodiment, the blended mixture comprises a mixture of styrene block elastomers. In another embodiment, the blended mixture comprises a styrene block elastomer blended with a low density polyethylene. The surface contact layer 12 may comprise 15-30% of the total film thickness. Ideally, the surface contact layer thickness is 18-22% of total film thickness.

More specifically, the surface contact layer comprises a blend selected from Blend 1, Blend 2, Blend 3, or Blend 4 as more fully described below.

Blend 1 consists essentially of a tackified quadblock styrene block copolymer elastomer and a triblock copolymer elastomer. The quadblock component will usually comprise 5-60 wt % of the blend and the triblock component will comprise 40-95 wt %.

The tackified quadblock copolymer is selected from styrene-isoprene-styrene-isoprene (S-I-S-I') and styrene-ethylene/propylene-styrene-ethylene/propylene (S-EP-S-EP') and mixtures thereof. In each case, the quadblock copolymer is compounded with a tackifier. Particularly preferred S-I-S-I' copolymers are disclosed in detail in US Published Application 2006/0151901, the disclosure of which is incorporated herein by reference. Preferred S-I-S-I' and S-EP-S-EP' quadblock copolymers are available from Kraton Polymers, LLC. Fully or partially saturated versions are preferred for the stability against oxidation and long storage.

The second essential component of Blend 1 is a triblock styrene block elastomers selected from styrene-isoprene-styrene (S-I-S); styrene-butadiene-styrene (S-B-S); styrene-ethylene/butadiene-styrene (S-EB-S) and styrene-ethylene/propylene-styrene (S-EP-S). S-EB-S and S-EP-S are fully saturated or hydrogenated version of S-I-S and S-B-S copolymers. In either case, the triblock elastomer may be compounded with up to 30% by weight of a corresponding diblock styrene copolymer elastomer, such as a styrene-isoprene (S-I); styrene-butadiene (S-B); styrene-ethylene/butadiene diblock copolymer (S-EB) or a styrene-ethylene/propylene diblock copolymer (S-EP). Such elastomers are commercially available from a variety of sources, including Kraton Polymers, LLC.

Blend 2 consists essentially of a tackified quadblock/triblock styrene block copolymer elastomer and a triblock copolymer elastomer. The quadblock/triblock component will usually comprise 5-60 wt % of the blend and the triblock component will comprise 40-95 wt %.

The quadblock/triblock copolymer component is a compounded mixture of S-I-S-I' or S-EP-S-EP' quadblock copolymers or mixtures thereof; S-I-S; S-B-S; S-EB-S or S-EP-S and mixtures thereof and a tackifier. Particularly preferred S-I-S-I' and S-EP-S-EP copolymers are disclosed in detail in US Published Application 2006/0151901, the disclosure of which is incorporated herein by reference. Preferred tackified quadblock and tackified triblock copolymers are available from Kraton Polymers, LLC. Fully or partially saturated versions are preferred for the stability against oxidation and long storage. Preferred triblock copolymers are S-EP-S and S-EB-S and mixtures thereof. Such elastomers are available from Kraton Polymers.

The second essential component of Blend 2 is a triblock styrene block copolymer elastomer selected from S-I-S, S-B-S, S-EB-S and S-EP-S or mixtures thereof, which can optionally contain up to 30 wt % of a diblock copolymer such as S-EB or S-EP. This is the same as the second component from Blend 1.

Blend 3 consists essentially of a tackified triblock styrene block copolymer elastomer and a triblock copolymer elastomer containing up to 30 wt % of a styrene diblock copolymer elastomer. The tackified triblock component will usually comprise 5-60 wt % of the blend and the triblock component will comprise 40-95 wt %.

The tackified triblock copolymer component comprises S-EB-S and S-EP-S or mixtures thereof and a tackifier. Such polymers are available from Kraton Polymers. The second essential component of Blend 3 is the same as in Blends 1 and 2.

Blend 4 consists essentially of a mixture of S-EB-S or S-EP-S triblock copolymer compounded with 0-30 wt % S-EB or S-EP diblock copolymer; and a low density polyethylene (LDPE). Suitable LDPE polymers have a density in the range of 0.915 to 0.925 and a melt index of 3 to 20. Such polymers are commercially available from a variety of sources. The triblock/diblock component constitutes 45-90 wt % of the mixture and the LPDE component comprises up to 10-55 wt % of the mixture.

The isoprene units in the S-I-S-I or S-I-S copolymers contain double bonds and may be sensitive to ultraviolet light. Accordingly, when an S-I-S-I copolymer is used, it may be desirable to add a UV stabilizer to the blend.

Tackifying resins are well known to those skilled in the art and a wide variety of different tackifying resins is available commercially. The tackifying resin to be used in the present invention might be hydrogenated or partially hydrogenated or non-hydrogenated hydrocarbon resin. The preferred resins are non-hydrogenated hydrocarbon resins or natural rosin resins. The tackifying resin preferably has a softening point as determined by the Ring and Ball method (ASTM E28) in the range of from 70 to 130° C. and more preferably 80 to 105° C.

The tackifying resin is present in an amount from 50 to 150 parts by weight ("pbw") per 100 parts by weight of block copolymer. A composition containing less than 50 pbw will not have sufficient tack and a composition containing more than 150 pbw will be too tacky and will be difficult to extrude in a coextrusion film. Preferably, the tackifying resin is present in an amount from 80 to 130 pbw, more preferably from 90 to 120 pbw, per 100 parts by weight of block copolymer.

The tackifying resins useful include hydrocarbon resins, synthetic polyterpenes, rosin esters and natural terpenes which are semi-solid or solid at ambient temperatures, and soften or become liquid at temperatures, ranging generally from 70° C. to 135° C., preferably from 85° C. to 120° C.

Exemplary of the primary tackifying resins are compatible resins such as: (1) natural and modified rosins such as, for example, gum rosin, wood rosin, tall oil rosin, distilled rosin, hydrogenated rosin, dimerized rosin and polymerized rosin; (2) glycerol and pentaerythritol esters of natural and modified rosins, such as, for example, the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g. styrene/terpene and alphamethyl styrene/terpene; (4) polyterpene resins having a softening point, as determined by ASTM method E28-58T, of from 80° C. to 150° C., the latter polyterpene resins generally resulting from the polymerization of terpene hydrocarbons, such as the bicyclic monoterpene known as pinene, in the presence of Friedel-Crafts catalysts at moderately low temperatures; (5) phenolic modified terpene resins and hydrogenated datives thereof such as, for example, the resin product resulting from the condensation, in an acid medium, of a bicyclic terpene and phenol; (6) aliphatic petroleum hydrocarbon resins having a Ball And Ring softening point of from 70° C. to 135° C., the latter resin resulting from the polymerization of monomers consisting primarily of olefins and diolefins; also included are the hydrogenated aliphatic petroleum hydrocarbon resins; (7) aromatic petroleum hydrocarbon resins, and mixed aromatic and aliphatic petroleum hydrocarbon resins, and the hydrogenated derivatives thereof; (8) aromatic modified alicyclic petroleum hydrocarbon resins and the hydrogenated derivatives thereof; and (9) alicyclic petroleum hydrocarbon resins and the hydrogenated derivatives thereof.

The preferred tackifying resins are represented by those of the subgroups (6), (7), (8) and (9) supra, or mixtures thereof. Most preferred tackifying resins have been found to belong to the type of resins as specified in subgroup 6. Examples of such resins are marketed under the trade names PICCOTAC, HERCULES MBG, HERCOTAC, WINGTACK and ESCOREZ, and in particular PICCOTAC 212 or 1094, and those resins marketed by EXXON under the trade name ESCOREZ 2000 series like ESCOREZ 2203 and those resins marketed by GOODYEAR under the trade name WINGTACK, like WINGTACK 95 and WINGTACK Extra. A preferred tackifying resin is PICCOTAC 212 or 1094, which actually consists of a modified aliphatic hydrocarbon resin.

The stiffening layer 14 serves multiple functions. First, it facilitates handling of the film during manufacture and use. Second, it serves as a release layer to prevent successive layers of the film from sticking to one another (i.e.; prevents the film from "blocking") as the film is wound on a roll during the manufacturing process. Third, the stiffening layer 14 maintains the topography of the surface contact layer 12. Fourth, the stiffening layer provides resistance to elongation when the film is peeled away from the substrate 20. This is important in maintaining film integrity.

In most embodiments, the stiffening layer 14 will comprise between 15% and 20% of the total thickness of the film. The stiffening layer 14 can be comprised of polyolefin polymers and, in preferred embodiments, comprises high density polyethylene (HDPE), a blend of linear low density polyethylene (LDPE) and HDPE, or a blend of LDPE and polypropylene (PP). If a blend of LDPE and HDPE is used, the LDPE may comprise between 5 and 30 wt % of the blend and the HDPE may comprise between 70 and 95 wt %. If a blend of LDPE and PP is used, the LDPE may comprise between 5 wt % and 20 wt % of the blend and the PP may comprise between 80 wt % and 95 wt %. Suitable LDPE polymers include those having a density of 0.915 to 0.925.

In some embodiments, cyclic olefin polymers and copolymers (COP) may also be used in the stiffening layer. Such polymers and copolymers tend to have rather high densities (i.e., >1 g/cc) and provide good stiffness characteristics yet are still flexible. If used in the stiffening layer, the COP would be used in amounts of 60% to 90% and may be blended with LDPE or linear medium density polyethylene (LMDPE).

The core layer 16 also serves multiple functions. First, the core needs to be sufficiently soft to enable the surface contact layer to conform to the topography of the textured substrates. Secondly, the core needs to have good cohesive strength to enable the film to be removed from the substrate without leaving any residue. The core layer can also aid in providing the desired opacity and/or color, stiffness and toughness to the masking film.

In preferred embodiments, the core layer is comprised of a polymer blend such as a combination of HDPE and LDPE; PP and LDPE, or all LDPE. If one of the combinations is used, the LDPE preferably comprises from 5 to 40 wt % of the core layer. The core layer can comprise between 40 and 70% of the total thickness of the film. As noted, the core layer is blended to provide adequate softness to enable the surface contact layer to conform to the surface of the textured substrate.

Fillers may be added to the core layer 16 or the stiffening layer 14 or both to obtain certain desired characteristics, including, film texture, static discharge, abrasion resistance, printability, writeability, opacity and color. Such fillers are well known in the art and include, for example, calcium carbonate, mica, titanium dioxide and silicon dioxide, synthetic silica, calcined clay and other synthetic fillers.

The total thickness of the film is generally between 25 and 100 microns. When applied to the textured substrates, the masking film preferably has a peel strength in the range of 1-700 g/in, more preferably 1-150 g/in, more preferably 1-40 g/in, more preferably 1-10 g/in, and most preferably between 1-5 g/in. The masking films can be made to be pulled from the textured substrate without leaving a residue, without tearing and without elongation.

In a preferred embodiment, the surface contact layer 12 includes a surface having a measure of smoothness between 0 and 1.52 microns, and more preferably, between 0 and 0.762 microns. The relatively rough or matt finish on the stiffening layer 14 includes a measure of roughness between 0.508 microns and 15.24 microns, and more preferably between 1.02 microns and 5.08 microns.

The films are preferable produced by blending the desired components for each layer, adding the blends to a respective extruder, and coextruding the film layers. Matte embossing (e.g., by extruding into a pair of nip rollers in which one roll is a smooth roll and the other roll is textured) is a preferred technique for imparting a sufficient level of roughness to the stiffening layer. However, texture may be imparted to the stiffening layer 14 via any suitable method including, without limitation, air impingement, air jets, water jets, and combinations thereof. The texture on the stiffening layer helps prevents blocking by precluding such intimate contact between the surfaces of the masking film and another surface such that the masking film can be easily unrolled and/or peeled away from another surface. This feature also prevents the wrinkling so often associated with traditional masking films. The multilayer matte-embossed film layer also may incorporates mechanical differential slip as opposed to chemical (anti-blocking agent) induced differential slip.

Preferably, the masking film is applied to a textured surface, with a surface roughness "Ra" in the range of 3-100 microns. Throughout this description, "smoothness" and "roughness" are defined as the arithmetic average height of the micropeaks and microvalleys of a surface to the centerline of such surface as measured by a profilometer. Smoothness and roughness defined in this manner typically are expressed in units of micrometers. All testing of surface textures (relative smoothness and roughness) were conducted in accordance with ANSI/ASME Test Method B46.1-1985.

The masking films disclosed herein are particularly suited for protection of textured surfaces such as polycarbonate, polyurethane, polyester, acrylic, polyvinyl chloride, nylon, PET, PETG, PEN, glass, ceramic, metal and various coatings. For example, textured polycarbonate film can be velvet (Ra of about 3.81 microns) and suede (Ra of 12.7-17.8 microns). Prismatic polyester can have a roughness in the range of from 5.08 to about 50 microns. Vinyl floor tiles can have a roughness in the range of from about 3.81 to about 10.16 microns.

EXAMPLES

A series of multilayer coextruded films were prepared using various blends in accordance with the above disclosure. All three layer films were made such that layer A (the surface contact layer) and layer C (the stiffening layer) each comprised 20% of the total film thickness and the core (layer B) comprised the remaining 60%. The two layer films comprised 20% surface contact layer (layer A) and the remaining 80% was the stiffening layer (layer C). The quadblock and triblock copolymers with blended tackifiers were obtained from Kraton Polymers, LLC. The other components were obtained from a variety of commercial sources. The composition of the films is set forth in Table 1. The polymers used in the surface contact layer ranged in density from 0.90 for the SEBS, to 0.924 for the LDPE, to 0.93 for the tackified block copolymers.

TABLE 1

| Ex. No. | Layer A | Tg (° C.) | Layer B | Density (g/cm$^2$) | Layer C | Density (g/cm$^2$) |
|---|---|---|---|---|---|---|
| 1 | 50% tackified quadblock copolymer 50% SEBS | −24 −55 | 63% HDPE 37% LDPE | 0.947 | 100% HDPE | 0.960-0.962 |
| 2 | 50% tackified quadblock copolymer 50% SEBS | −24 −55 | 63% HDPE 23% MDPE 10% LDPE 4% organic antiblock | 0.952 | 88% HDPE 12% organic antiblock | 0.960-0.962 |
| 3 | 50% tackified quadblock copolymer 50% SEBS | −24 −55 | 63% HDPE 23% MDPE 10% LDPE 4% organic antiblock | 0.952 | 90% HDPE 10% organic antiblock | 0.960-0.962 |

TABLE 1-continued

| Ex. No. | Layer A | Tg (° C.) | Layer B | Density (g/cm³) | Layer C | Density (g/cm³) |
|---|---|---|---|---|---|---|
| 4 | 43% tackified quadblock copolymer 57% SEBS | −24 −55 | 63% HDPE 27% MDPE 10% LDPE | 0.952 | 100% HDPE | 0.960-0.962 |
| 5 | 43% tackified quadblock copolymer 57% SEBS | −24 −55 | 63% HDPE 37% LDPE | 0.947 | 100% HDPE | 0.960-0.962 |
| 6 | 43% tackified quadblock copolymer 57% SEBS | −24 −55 | 63% HDPE 33% LDPE 4% organic antiblock | 0.949 | 88% HDPE 12% organic antiblock | 0.960-0.962 |
| 7 | 21% tackified quadblock copolymer 79% SEBS | −24 −55 | 63% HDPE 36.3% LDPE 0.7% blue colorant | 0.947 | 100% HDPE | 0.960-0.962 |
| 8 | 15% tackified quadblock copolymer 85% SEBS | −24 −55 | 63% HDPE 36.3% LDPE 0.7% blue colorant | 0.947 | 100% HDPE | 0.960-0.962 |
| 9 | 9% tackified quadblock copolymer 91% SEBS | −24 −55 | 63% HDPE 36.3% LDPE 0.7% blue colorant | 0.947 | 100% HDPE | 0.960-0.962 |
| 10 | 88% SEBS 12% LDPE | −55 −100 | 63% HDPE 37% LDPE | 0.947 | 100% HDPE | 0.960-0.962 |
| 11 | 75% SEBS 25% LDPE | −55 −100 | 63% HDPE 37% LDPE | 0.947 | 100% HDPE | 0.960-0.962 |
| 12 | 75% SEBS 25% LDPE | −55 −100 | 85% cyclic olefin copolymer 15% LDPE | 0.990 | 100% HDPE | 0.960-0.962 |
| 13 | 67% SEBS 33% LDPE | −55 −100 | 63% HDPE 37% LDPE | 0.947 | 100% HDPE | 0.960-0.962 |
| 14 | 64% SEBS 36% LDPE | −55 −100 | 63% HDPE 37% LDPE | 0.947 | 100% HDPE | 0.960-0.962 |
| 15 | 55% SEBS 45% LDPE | −55 −100 | 63% HDPE 37% LDPE | 0.947 | 100% HDPE | 0.960-0.962 |
| 16 | 47% SEBS 53% LDPE | −55 −100 | 63% HDPE 37% LDPE | 0.947 | 100% HDPE | 0.960-0.962 |
| 17 | 50% tackified triblock copolymer 50% SEBS | −3 −55 | 63% HDPE 37% LDPE | 0.947 | 100% HDPE | 0.960-0.962 |
| 18 | 100% SEBS | −55 | 63% HDPE 37% LDPE | 0.947 | 100% HDPE | 0.960-0.962 |
| 19 | 37% tackified quadblock copolymer 63% SEBS | −3 −55 | | | 63% HDPE 37% LDPE | 0.947 |
| 20 | 50% tackified quadblock copolymer 50% SEBS | −24 −55 | | | 63% HDPE 37% LDPE | 0.947 |
| 21 | 50% tackified quadblock copolymer 50% SEBS | −24 −55 | | | 100% HDPE | 0.960-0.962 |
| 22 | 50% tackified quadblock copolymer 50% SEBS | −24 −3 | | | 70% cyclic olefin copolymer 30% MDPE | 0.978 |
| 23 | 50% tackified quadblock copolymer 50% SEBS | −24 −55 | | | 70% cyclic olefin copolymer 30% LDPE | 0.978 |
| 24 | 50% tackified triblock copolymer 50% SEBS | −3 −55 | | | 97% HDPE 3% organic antiblock | 0.960-0.962 |
| 25 | 50% tackified triblock copolymer 50% SEBS | −3 −55 | | | 63% HDPE 37% LDPE | 0.947 |
| 26 | 50% tackified triblock copolymer 50% SEBS | −3 −55 | | | 100% HDPE | 0.960-0.962 |
| 27 | 50% tackified triblock copolymer 50% SEBS | −3 −55 | | | 63% HDPE 37% LDPE | 0.947 |

Several of the films were then tested on various substrates for 180 degree peel adhesion. The method consists of laminating the film to one of three different polycarbonate prism substrates by placing the film against the substrate and rolling it with a 22 kg roller. The film was allowed to set for 1-2 hours at room temperature. The film was then removed from the substrate by pulling the film at 180 degrees (i.e., while the film was substantially parallel to the substrate surface) using an AR 1000 instrument at a speed of 12" per minute. Results are reported in Table 2.

TABLE 2

| Example | Substrate | Peel strength (g/in) |
| --- | --- | --- |
| 5 | Prism 1 | 12 |
| 5 | Prism 2 | 8.5 |
| 5 | Prism 3 | 3.5 |
| 17 | Prism | 12-13 |
| 16 | Polycarbonate | 1.0 |
| 15 | Polycarbonate | 6.5 |
| 14 | Polycarbonate | 14 |
| 19 | Prism | 6.5 |
| 20 | Prism | 19.9 |
| 21 | Prism | 27.5 |
| 22 | Prism | 17.2 |
| 23 | Prism | 5.4 |
| 24 | Prism | 36.5 |
| 25 | Prism | 36.3 |
| 26 | Prism | 34.1 |
| 27 | Prism | 11.8 |

The masking films are capable of providing a controlled, adjustable and adequate level of protection to textured surfaces without any pressure sensitive adhesives and their associated disadvantages. The peel strength can be adjusted based on the particular substrate by adjusting the amount of the tackified quadblock, tackified triblock, or non-tackified triblock copolymer component The unique advantages of the protective film allow the film to be modified to meet the desired substrate's chemistry and topography.

We claim:

1. A film comprising a surface contact layer and a stiffening layer, wherein the surface contact layer consists essentially of a mixture selected from the group consisting of:
   a) a mixture of a tackified quadblock styrene block copolymer elastomer and a triblock styrene block copolymer containing up to 30 wt% of a diblock styrene copolymer; and
   b) a mixture of a tackified quadblock styrene block copolymer elastomer, a tackified triblock styrene block copolymer and a triblock styrene block copolymer containing up to 30 wt% of a diblock styrene copolymer.

2. The film of claim 1, wherein the surface contact layer consists essentially of
   a) 5 to 60 wt% of a tackified quadblock styrene block copolymer elastomer selected from styrene-isoprene-styrene-isoprene and styrene-ethylene/propylene-styrene-ethylene/propylene; and
   b) 40 to 95 wt% of a
      i) styrene-ethylene/butadiene-styrene triblock copolymer, containing up to 30 wt% of styrene-ethylene/butadiene diblock copolymer, or
      ii) styrene-ethylene/propylene-styrene triblock copolymer containing up to 30 wt% of a styrene-ethylene/propylene diblock copolymer.

3. The film of claim 1, wherein the surface contact layer consists essentially of:
   a) 5 to 60 wt% of
      i) a tackified quadblock styrene block copolymer elastomer selected from styrene-isoprene-styrene-isoprene and styrene-ethylene/propylene-styrene-ethylene/propylene compounded and
      ii) a tackified triblock styrene copolymer selected from styrene-ethylene/butadiene-styrene and styrene-ethylene/propylene-styrene; and
   b) 40 to 95 wt% of a
      i) styrene-ethylene/butadiene-styrene triblock copolymer, containing up to 30 wt% of styrene-ethylene/butadiene diblock copolymer, or
      ii) styrene-ethylene/propylene-styrene triblock copolymer containing up to 30 wt% of a styrene-ethylene/propylene diblock copolymer.

4. The film of claim 1, further comprising a core layer interposed between the surface contact layer and the stiffening layer.

5. The film of claim 4, wherein the core layer is selected from low density polyethylene, high density polyethylene, medium density polyethylene, cyclic olefin copolymer, and mixtures thereof.

6. The film of claim 4, wherein the stiffening layer comprises 15-20% of the total thickness of the film.

7. The film of claim 4, wherein the surface contact layer consists of polymers having a Tg of less than 0° C.

8. The film of claim 4, wherein the stiffening layer has a density of 0.94 to 0.98 g/cm$^2$ and wherein the core layer has a density of 0.94 to 0.99 g/cm$^2$ and wherein the surface contact layer consists of polymers having a density of 0.90 to 0.93 g/cm$^2$.

9. The film of claim 1, wherein the surface contact layer comprises 15-30% of the total thickness of the film.

10. A film comprising a surface contact layer and a stiffening layer, wherein the surface contact layer consists essentially of:
   a. a mixture of a tackified quadblock styrene block copolymer elastomer and a triblock styrene block copolymer containing up to 30 wt% of a diblock styrene copolymer;
   b. a mixture of a tackified quadblock styrene block copolymer elastomer, a tackified triblock styrene block copolymer and a triblock styrene block copolymer containing up to 30 wt% of a diblock styrene copolymer;
   c. a mixture of a tackified triblock styrene block copolymer and a triblock styrene block copolymer containing up to 30 wt% of a diblock styrene copolymer; and
   d. a triblock styrene block copolymer containing up to 30 wt% of a styrene diblock copolymer and a low density polyethylene polymer.

* * * * *